United States Patent
Pierce et al.

(10) Patent No.: US 9,921,804 B2
(45) Date of Patent: *Mar. 20, 2018

(54) MOVIE MODE AND CONTENT AWARDING SYSTEM AND METHOD

(71) Applicant: BBY SOLUTIONS, INC., Richfield, MN (US)

(72) Inventors: Donald N. Pierce, Boulder, CO (US); Jaclyn Knapp, Boulder, CO (US); Dan Fox, Boulder, CO (US); Ken Slater, Boulder, CO (US); Tony Tung, Elk Grove, CA (US); Heather Look, Bloomington, MN (US); Stacy Anderson, Woodbury, MN (US); William Don Wortley, Minneapolis, MN (US); Carrie Barclay, Minnetonka, MN (US); Justin Ebert, South Orange, NJ (US)

(73) Assignee: BBY SOLUTIONS, INC., Richfield, MN (US)

( * ) Notice: Subject to any disclaimer, the term of this patent is extended or adjusted under 35 U.S.C. 154(b) by 250 days.

This patent is subject to a terminal disclaimer.

(21) Appl. No.: 14/674,290

(22) Filed: Mar. 31, 2015

(65) Prior Publication Data
US 2015/0205578 A1 Jul. 23, 2015

Related U.S. Application Data

(63) Continuation of application No. 13/049,295, filed on Mar. 16, 2011, now Pat. No. 9,026,102.
(Continued)

(51) Int. Cl.
*G06F 3/16* (2006.01)
*H04M 1/725* (2006.01)
(Continued)

(52) U.S. Cl.
CPC ............ *G06F 3/167* (2013.01); *G06F 3/0484* (2013.01); *G06Q 30/02* (2013.01);
(Continued)

(58) Field of Classification Search
CPC ....... H04W 4/021; H04W 4/022; H04W 4/12; H04W 4/16; H04W 4/18; H04W 4/06; H04W 4/185; H04W 4/023
(Continued)

(56) References Cited

U.S. PATENT DOCUMENTS 7,869,792 B1   1/2011   Zhou et al.
8,019,324 B2   9/2011   Roth et al.
(Continued)

OTHER PUBLICATIONS

Dec. 28, 2012 USPTO Office Action (U.S. Appl. No. 13/049,295).
(Continued)

*Primary Examiner* — Jean Gelin
(74) *Attorney, Agent, or Firm* — Tysver Beck Evans

(57) ABSTRACT

A system and method is presented for awarding content to users of mobile devices for attending events, appearing at locations, or viewing audiovisual content. One embodiment also automatically alters the configuration of mobile devices, which is particularly useful in movie theaters. An application on the device recognizes an audible signal provided at the location or in the audiovisual content. The signal can also be used to unlock content. In this way, desired content is available only when the user has attended an event such as an event sponsored by the content creator. The content can relate to the event, and can be synchronized to the event. The signal can also trigger an application or unlock content at a store location. For example, a scavenger hunt can be guided by an application on the mobile device.

16 Claims, 4 Drawing Sheets

Related U.S. Application Data

(60) Provisional application No. 61/314,315, filed on Mar. 16, 2010.

(51) Int. Cl.
*H04W 4/02* (2018.01)
*G06Q 30/02* (2012.01)
*G06F 3/0484* (2013.01)

(52) U.S. Cl.
CPC ..... *G06Q 30/0207* (2013.01); *G06Q 30/0239* (2013.01); *H04M 1/72522* (2013.01); *H04W 4/021* (2013.01); *H04M 1/72525* (2013.01); *H04M 1/72569* (2013.01)

(58) Field of Classification Search
USPC ....... 455/414.1, 414.2, 414.3, 411, 558, 418, 455/419, 420, 521, 3.01, 3.05, 3.06, 466, 455/556.1, 557, 563; 705/5, 10, 14, 26; 709/220, 233; 725/100, 110, 112, 113, 725/145, 146
See application file for complete search history.

(56) References Cited

U.S. PATENT DOCUMENTS

| | | | |
|---|---|---|---|
| 8,090,768 | B2 | 1/2012 | Johnson et al. |
| 8,251,875 | B2 | 8/2012 | Ellis et al. |
| 8,996,380 | B2 | 3/2015 | Wang et al. |
| 2005/0020223 | A1 | 1/2005 | Ellis et al. |
| 2005/0071253 | A1 | 3/2005 | Yang |
| 2007/0113166 | A1 | 5/2007 | Stovin |
| 2007/0250194 | A1 | 10/2007 | Rhoads et al. |
| 2009/0030978 | A1 | 1/2009 | Johnson et al. |
| 2009/0253454 | A1 | 10/2009 | Sampson |
| 2009/0307361 | A1 | 12/2009 | Issa et al. |
| 2010/0234002 | A1 | 9/2010 | Scheffer et al. |
| 2010/0279652 | A1 | 11/2010 | Sharp et al. |
| 2010/0304731 | A1 | 12/2010 | Bratton et al. |
| 2010/0318357 | A1 | 12/2010 | Istvan et al. |
| 2011/0213657 | A1 | 9/2011 | O'Malley et al. |
| 2011/0214143 | A1* | 9/2011 | Rits ................... G06F 17/30026 725/34 |
| 2011/0223893 | A1 | 9/2011 | Lau et al. |
| 2012/0059534 | A1 | 3/2012 | Zilka |
| 2013/0247082 | A1 | 9/2013 | Wang et al. |

OTHER PUBLICATIONS

Jun. 25, 2013 USPTO Office Action (U.S. Appl. No. 13/049,295).
Sep. 8, 2014 USPTO Office Action (U.S. Appl. No. 13/049,295).
Brands Lining Up to Integrate Shazam into their Ads!; Jun. 16, 2011; http://news.shazam.com/pressreleases/brands-lining-up-to-integrate-shazam-into-their-ads-890843; Downloaded Jul. 14, 2015.
Dockers® and Shazam® Partner to Bring "Wear the PantsTM" Campaign to Smartphones Everywhere; Jan. 20, 2010; http://news.shazam.com/pressreleases/dockers-r-and-shazam-r-partner-to-bring-wear-the-pants-campaign-to-smartphones-everywhere-890685, Downloaded Jul. 14, 2015.
"Shazam Launches Enhanced Music Discovery Application on Apple App Store;" Jun. 24, 2009; http://news.shazam.com/pressreleases/shazam-launches-enhanced-music-discovery-application-on-apple-app-store-890476; Downloaded Jul. 14, 2015.
Shazam Targets Brands and Broadcasters with the Launch of SARA (Shazam Audio Recognition Advertising); Feb. 16, 2010; http://news.shazam.com/pressreleases/shazam-targets-brands-and-broadcasters-with-the-launch-of-sara-shazam-audio-recognition-advertising-890698; Downloaded Jul. 14, 2015.
EBSCO Host Connection, Shazam to Launch Music Service in US; Apr. 2004; (http://search.ebscohost.com/login.aspx?direct=true&authtype=cookie&db=8gh&db=aph&db=awh&db=buh&db=bwh&db=c9h&db=cmh&db=dch&db=edspub&db=eoah&db=scope=site).
Musciphone, Shazam Bow Music Recognition in U.S.; Apr. 12, 2004.
Shazam Announces Application for iPhone, Jul. 10, 2008.
Shazam Surpasses 100 Million Users and Becomes One of the World's Leading; Dec. 6, 2010.

\* cited by examiner

MOVIE MODE AND CONTENT AWARDING SYSTEM AND METHOD

FIELD OF THE INVENTION

The present application relates to the field of mobile devices such as cellular phones. More particularly, the described embodiments relate to triggering applications running on those devices through the use of an audible sonic signal, where such applications award the user with desired content or alter the device's current operating parameters.

SUMMARY

One embodiment of the present invention provides an application that puts mobile devices into a configuration appropriate for use in movie theaters. This is accomplished by an application on the device that recognizes a signal provided in the movie theater. In one embodiment, the signal is audible. The embodiment also works at other locations where the signal is present, such as a retail store or during the playing of audiovisual content on a television or computer display.

The signal can also be used to unlock or otherwise provide access to content. In this way, desired content is awarded to a user only when the user has performed the steps desired by the signal creator, such as attending an event or viewing particular audiovisual materials. In some embodiments, the awarded content relates to the event at which the signal is received. In these embodiments, the awarded content may synchronize with the event. In the context of a movie theater, the awarded content could be synchronized with the content displayed on a movie screen, such as during movie's credits. In another embodiment, the content is available after receiving the signal, but is not synchronized with the event at which the signal was received.

In yet another embodiment, the signal is used to trigger an application to unlock content at a store location. For example, a scavenger hunt can be guided by an application on the mobile device. The receipt of a signal or the use of Wi-Fi triangulation can trigger the unlocking of content, such as an application, entertainment content, or a digital coupon. In this way customers can be incentivized to visit the store.

DETAILED DESCRIPTION

Altering Device Settings—Movie Mode

Figure 1:
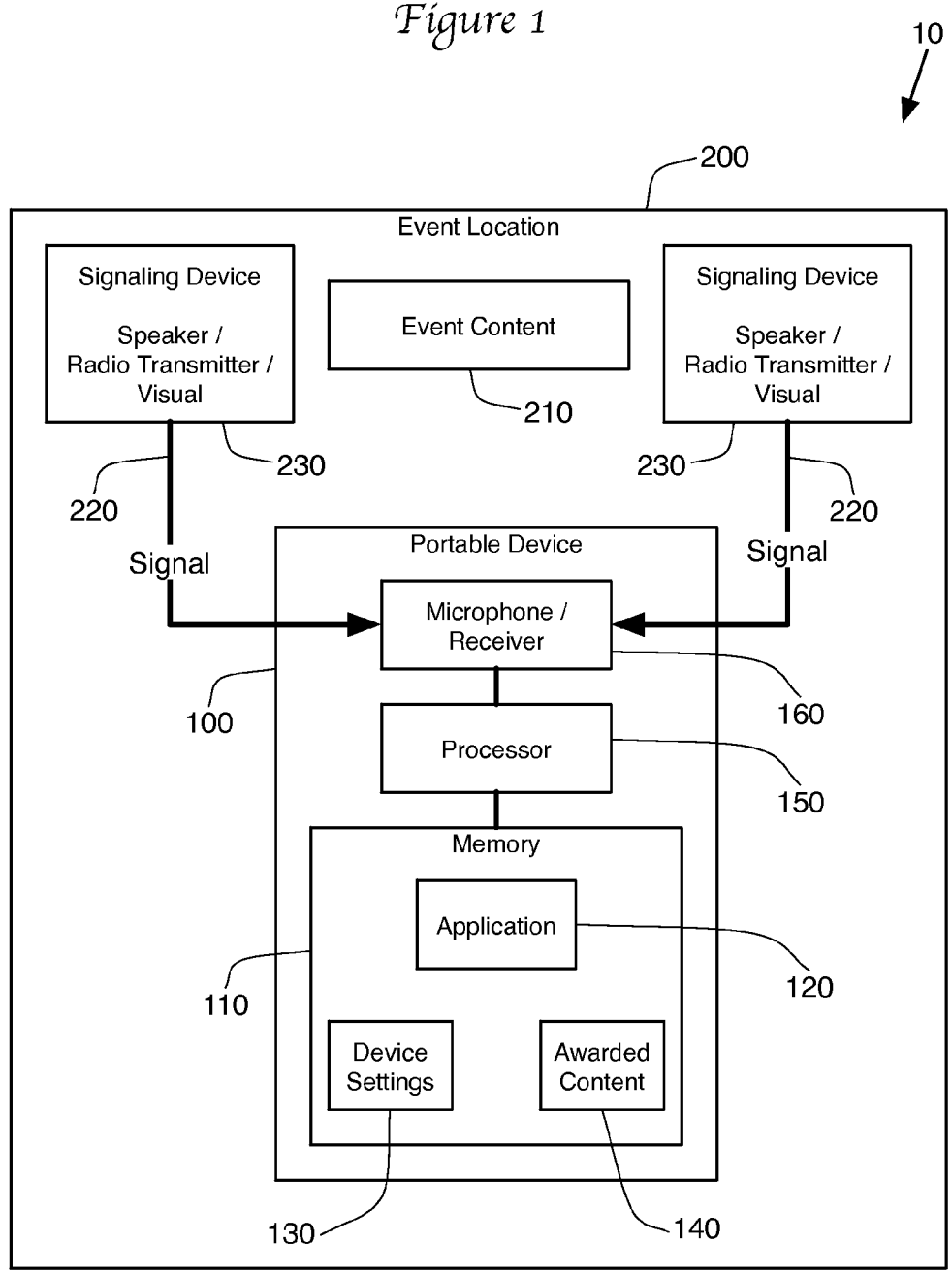
FIG. 1 is a schematic diagram showing the primary elements of a first embodiment of the present invention.
Figure 2:
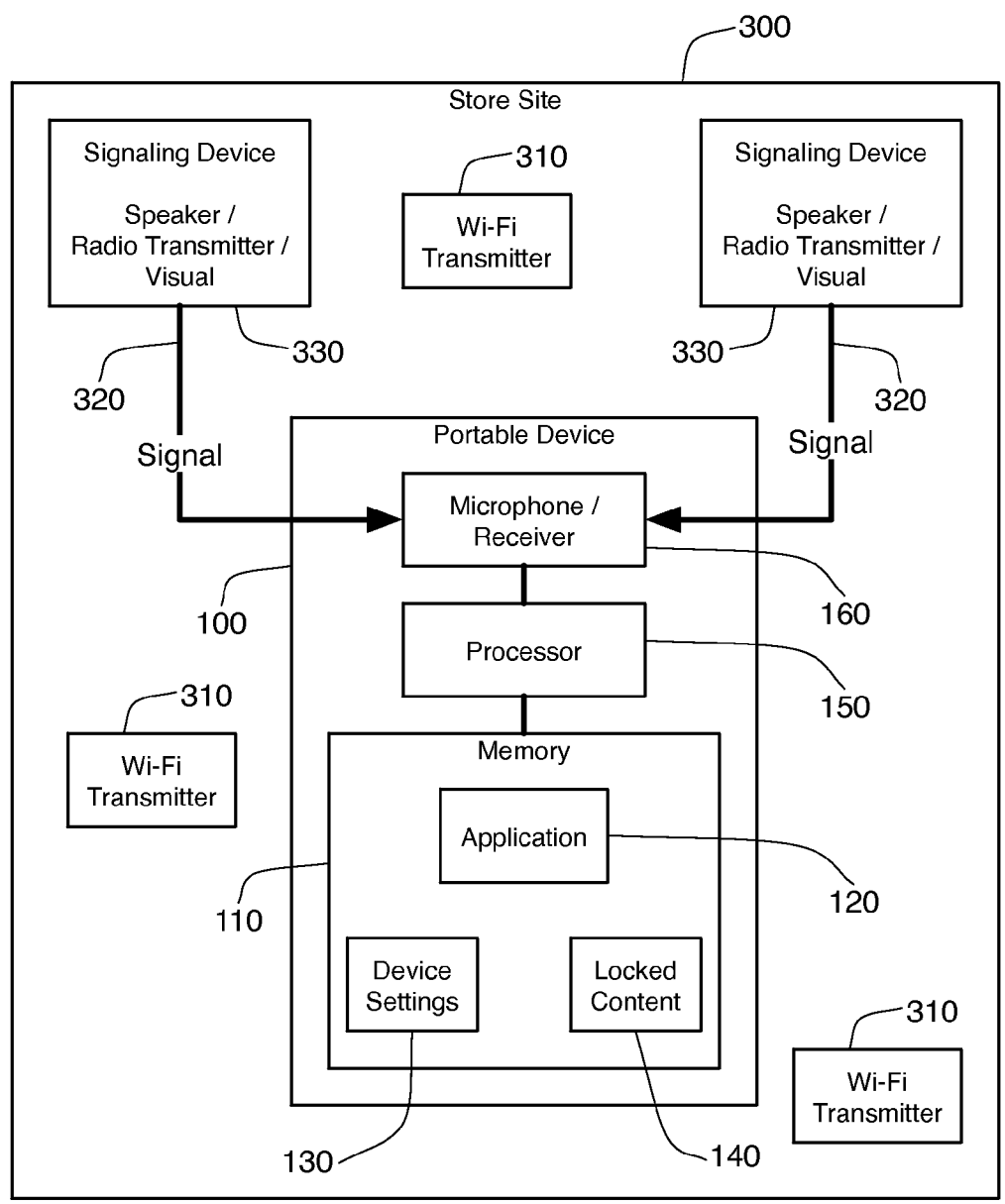
FIG. 2 is a schematic diagram showing the primary elements of a second embodiment of the present invention.

A system 10 using one embodiment of the present invention is shown in FIG. 1, in which a portable device 100 is located within an event location 200. The portable device 100 could be a cell phone, a personal organizer, a pocket PC, a tablet computer, a media reader, a portable media player, or the like. The portable device 100 is preferably personally sized and easily carried by the user (under two pounds). The device 100 contains non-transitory, tangible, digital memory 110 such as RAM, ROM, physical hard drive, or FLASH memory. This memory 110 contains at least one application 120, device settings 130, and various types of content including the awarded content 140. The application 120 is a digital program that operates on a processor 150. This processor 150 could be any of the standard, general purposes processors or chipsets available on the market, such as the RISC chips developed by ARM Holdings of Cambridge, England or the Apple A4 (or A5) system-on-a-chip developed by Apple Inc. of Cupertino Calif.

In this embodiment, application 120 is capable of putting the device 100 into a configuration appropriate for use in the event location 200. For instance, the event location 200 may be a movie theater in which a feature movie 210 is showed to an audience. Alternatively, the event location 200 could be a playhouse or a concert auditorium, and the event content 210 could be a live play or musical concert. The configuration of the device 100 by the application 120 is accomplished by changing the device settings 130 stored in memory 110. In one embodiment, the application 120 will put the device 100 in "movie mode" when in a movie theater, changing the device settings 130 so as to:

1) prevent the operation of recording devices (camera and audio recording),
2) bring the ringer volume to silent or to enter vibration mode, and
3) dim the screen light.

The movie mode setting may also change other device settings 130, such as putting the device into a low battery consumption configuration. In fact, the device settings 130 could even disable the ability to make or receive phone calls and SMS or MMS messages. In some circumstances, these settings 130 can be accomplished by placing the device 100 in a predefined mode, such as "airplane mode." In other circumstances, the settings 130 are altered individually by the application 120.

In one embodiment, different versions of the application 120 are created for different types of portable devices 100. For example, separate versions could be created for mobile devices that operate Windows, Android, Blackberry, and Apple's iOS operating systems. These different applications 120 may have separate functionality depending upon the capabilities of the devices 100 and their operating systems. For example, it is relatively simply to dim the screen on devices 100 running all four of these operating systems through the application 120. In contrast, while some devices 100 allow an application 120 to disable the audible ringer through the device's API, devices 100 running other operating systems require that the user manually turn off the ringer. In the latter case, the application 120 must determine if the device is set to have an audible ring, and if so then require that the user turn off the ringer before proceeding.

In some cases, the application 120 will need to be launched on the device before the application 120 is able to monitor the receiver 160 for the signal 220. In these cases, the user will need to be prompted or otherwise encouraged to launch the application 120. For instance, a movie theater may present an introductory video encouraging users to turn on the application 120 at the beginning of every movie. Similarly, a retail store may post a sign within the store reminding customers to turn on their application 120 in order to gain access to desired content. In other devices 100, the application 120 can run continuously in the background, thereby allowing the user to simply enter the event location 200 and have the device 100 automatically detect the signals 220.

Signals 220

In order for the application 120 to know when the settings 130 for the device 100 should be changed for an event location 200, the application 120 monitors a receiver 160 found on the device 100. In one embodiment, the receiver 160 is a microphone that receives one or more audible signals 220 that are recognized by the application 120 as indicative of the event location 200. In another embodiment, these signals 220 are radio signals. In yet another embodiment, the signals 220 can take the form of a visual signal (i.e., a bar code) that is triggered by viewing the visual signal with a camera embedded on the device 100. These signals 220 are transmitted by one or more signaling devices 230 found in the event location 200. For audible signals 220, the signaling devices 230 may take the form of speakers capable of creating the signal 220. In the context of a movie theater, a concert auditorium, or a playhouse, the speakers 230 could be speakers already used by the event location 200 for supporting the event content 210. Radio signals 220 can be transmitted by a radio transmitter 230. Many devices 100 are able to locate their position by examining the known location of Wi-Fi transmitters that transmit signals being received by the device 100. These devices 100 could therefore identify when the device is within the event location 200 through Wi-Fi transmitter identification. Visual signals 220 could be displayed on a wall or screen of the event location 200, or even on a smaller sign that is encountered by users when entering or within the event location 200.

If the signal is audible, the signal can take the form of a sequence of audible frequencies that the device is configured to recognize. Other signals may include inaudible frequencies or visual cues. An audible signal 220 could take the form of a unique set of frequencies, durations, number of tones, arrangement of tones, etc. A particular configuration of the signal 220 should be tested in a variety of locations 200 under real-world conditions in order to determine the likelihood that all devices 100 in that location 200 will receive the signal 220. Testing has revealed that some of the more successful signals use four successive tones.

The application 120 monitors inputs from the microphone 160 to recognize the signals 220 as indicative of the event location 200. Note that in some embodiments, the signals 220 can be indicative of the event content 210 and not the particular location 200. For example, the signal 220 could be embedded into the beginning of a feature movie 210. The signals 220 that are generated would be the same in every movie theater 200 that is showing that particular feature 210. In this embodiment, the same audible signals generated in the movie theater would also be generated when the movie is transferred to a Blu-ray or DVD optical disk and played on a home theater system, or when the movie is transmitted or streamed to the home over a television broadcast or a video on demand service. In some circumstances, additional signals could be embedded in the version of the film intended for home viewing. For instance, versions intended for the movie theater can be encoded so that the application does not present any visual distractions on the mobile device during the movie, while the home theater versions may allow related content to appear on the screen of the mobile device during the movie. The application 120 can be the same in both environments—all that is required is that the signals 220 generated by the movie allow the application 120 to distinguish between these environments.

It is also possible that the signals 220 could be generated by a movie theater 200 without embedding the signals in the sound track of a particular movie. In this case, a movie theater 200 could present the audible signal 220 before every film 210 presented, with the signals 220 presented by the theater 200 remaining unchanged between different films 210.

Awarding Content

As explained above, the application 120 is designed to alter the device settings 130 upon receipt of a signal 220 indicative of either the event content 210 or a particular location 200. In another embodiment, the application 120 uses the signal 220 to award access to particular content, such as awarded content 140. The user of the device 100 may have downloaded this content 140 when the user downloaded or otherwise installed the application 120. In this case, the content 140 is locked or otherwise unavailable for use by the user until the device 100 receives the appropriate signal or signals 220. Alternatively, upon receipt of the signal 220, the application 120 can allow the downloading of content 140 from a central server at a later time. To allow the downloading of the content 140 only after the receipt of signal 220, a link to the content 140 can be provided only within the application 120, where the application 120 can keep the link hidden or inoperative until the signal 220 is received.

The content 140 could take the form of entertainment content (such as a song or video clip) or an additional application that can be operated on the device 100. The content could also enhance an existing application, such as adding a new character, adversary, or level for a game application operating on the device 100. This signals 220 could also be used by the application 120 to identify the current location of the user. In this way, the signals could be used to "check-in" a user at that location in a game or social media application. These types of applications may track user's whereabouts in a central database that tracks the check-in locations of multiple users, and could award points for the number, frequency, or variety of locations visited by the user and confirmed by the application 120 using these unique signals 220.

Users seeking access to content 140 would be required to have application 120 on their mobile device 100 in order to receive the signal 220. That signal 220 would only be available for receipt at an event, such as at a movie theater, a musical concert, or a sporting event, or at some other location, such as a retail store, coffee shop, or restaurant. Alternatively, the signal 220 could be recorded into a DVD or Blu-ray disc, so that the user would have to view the disc in order to access the content 140. In yet another embodiment, the signal is recorded in audio/video material available over the Internet or over a television signal, such as retailer or manufacturer's commercial that is available for viewing on a website or transmitted over a television channel.

Synchronization

When the signal 220 is transmitted at a predetermined point in time in the event content 210, the application 120 can use the signal 220 to synchronize its operation with the event content 210. For example, the signal 220 could be encoded into the audio soundtrack of a feature movie 210. Upon receipt of the signal 220, the application 120 synchronizes the mobile device 100 with the movie 210 by noting the time at which the signal 220 was received by the device 100. Once synchronized, the mobile device 100 may deliver additional content to movie viewers that supplements the movie 210. The application 120 may rely upon a single synchronizing signal. Alternatively, the application 120 may recognize many synchronizing signals 220 in order to ensure that the application remains properly synchronized with the event content 210.

In one embodiment, the device 100 provides synchronized translations on the device 100 of a nonsensical language spoken by several of the characters in a feature movie or advertisements presented as part of the event content 210. For example, this translation can take the form of written text on the display of the mobile device 100 during the rolling of the movie credits. The text is synchronized to serve as a "translation" of unintelligible (or foreign language) dialog that is occurring during the credits. All that is required to perform this functionality is a synchronization signal at some point in the movie soundtrack and a timer within the application 120 to present the translated text on the device 100 at the appropriate time in conjunction with the event content 210. For example, the signal 220 could occur at the beginning of a feature film. The signal could trigger the application 120 to alter the device settings 130, putting the device into movie mode. The application 120 could also begin a timer, so that when the movie ends and the credits start to roll, the device could synchronize the "translations" with on-screen action. As would be clear to one of ordinary skill, this synchronization capability would allow the phone to present stored content 140 or otherwise interact with the event content 210 in a variety of ways.

The synchronization routines in the application 120 must reflect the real-world operations of the device 100 so that any delays inherent in a particular type of device 100 are recognized and accounted for by the application 120. For instance, certain device operating systems or hardware may require additional time between processing the recognition of the signal 220 and the display of synchronized content.

The significance of this embodiment is that it changes the movie user experience from a traditional view-only experience to having an added dimension of a second communications channel. In one embodiment, this synchronized communication channel provides a translation of a nonsensical language that could not otherwise be deciphered by merely watching the movie 210. The second layer of significance is that the same sonic signal 220 used for synchronization may also serve as an unlocking cue for additional enhanced content 140, such as an entertainment file available for later use. Furthermore, when this aspect of the invention is combined with the movie mode alteration of the device settings 130, it can be seen that the system 10 can reward viewers that use this method to put their phones or other mobile devices 100 into an appropriate configuration 130. Because the signal 220 can be audible and embedded on a movie soundtrack, the system 10 does not require additional effort on the theater exhibitor's part and in fact, allows them to partner with groups that will generate additional content 140, resulting in added value to the moviegoing experience.

In-Store Mode

In yet another embodiment, the application 120 recognizes signals 220 in locations other than an event location 200, such as a retail store site 300. In this site 300, the application 120 may still be triggered upon receipt of a signal 320 from a signaling device 330. The signal 320 may be audible (a sound from a speaker), may be visual (capturing an image on the device's camera, such as a 2D barcode, a character, or a logo), or may be a radio frequency signal (such as a Wi-Fi identification or even Wi-Fi triangulation where the signal 320 is considered received upon achieving a particular location within the store site 300).

The application 120 can include the ability to interact with the store site 300. For instance, the application can use Wi-Fi triangulation within the store to present the user with a map of the store and their current location. The signal 320 serves to unlock a scavenger hunt application 120 that will direct users to different locations within the store site 300. At least three Wi-Fi transmitters 310 within the store site 300 help to identify locations in the store. The application 120 uses these transmitters 310 to provide users with visual or audible feedback measuring the distance to a particular desired location within the store site 300. Once the user arrives at the location, the application 120 can provide special content or coupons for the user to use at the store.

In one example, when the user achieves the correct location in the site 300, the application 120 will display special content on top of a live image created by the mobile device's camera. This "augmented reality" display may include characters or icons relevant to a co-branding agreement between the store and a third party, such as characters from a newly released movie. Once the character or icon is presented on the device's display, the user can interact with the display to earn additional content or the store coupon. Store coupons can be electronic, with the application 120 presenting a scannable barcode on the display of the device 100 that can be read by the store's point of sale checkout devices.

Methods

Figure 3:
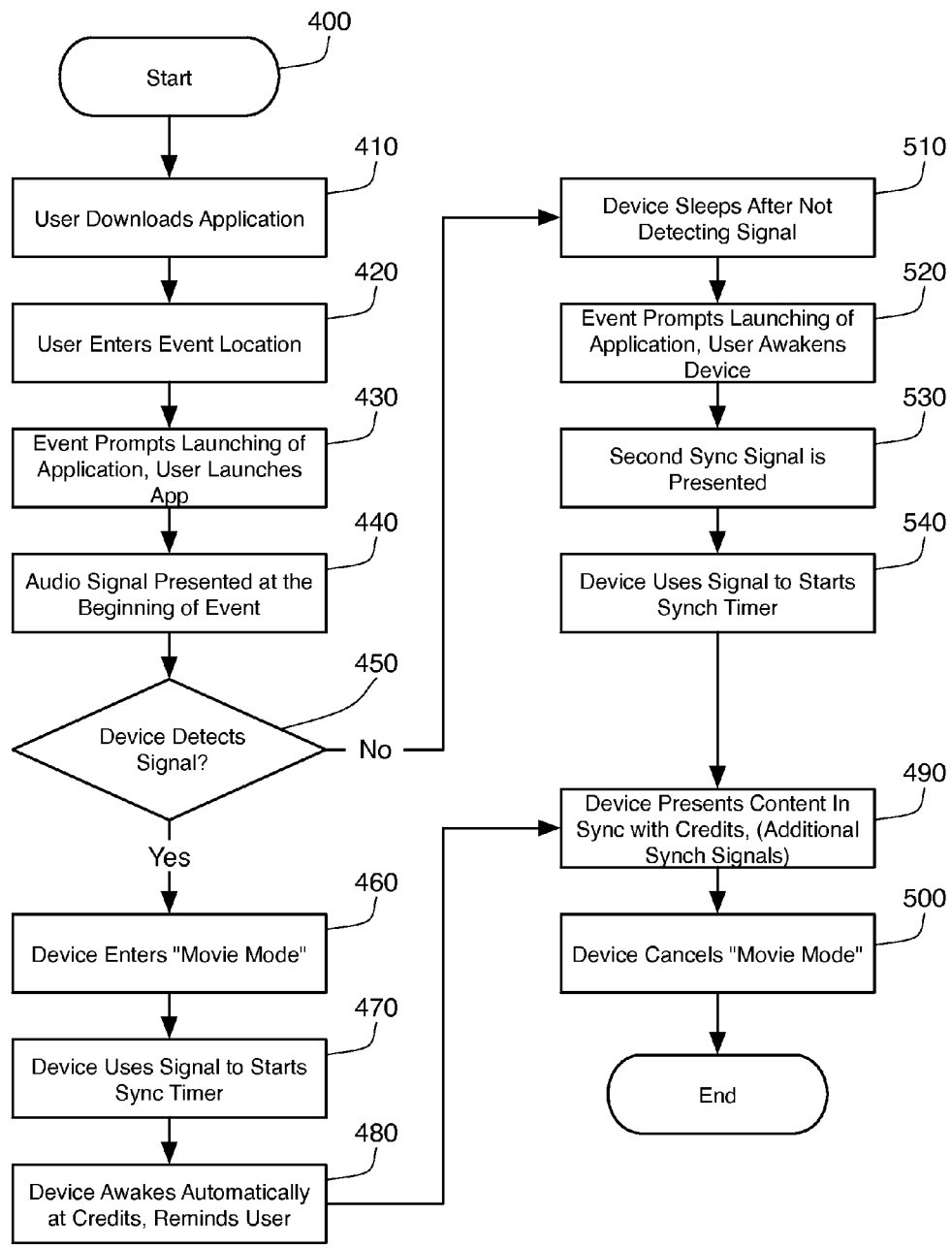
FIG. 3 is a flow chart showing a first method of using an embodiment of the present invention.

In FIG. 3, a method 400 for implementing one embodiment of the present invention is presented. The first step 410 is for the user to download the application 120 to their device. Once the application 120 is on the device 100, the user can enter the event location 200 with their device 100 at step 420. Alternatively, the user could watch content on a television screen or a computer monitor where the appropriate signals have been embedded into the audio track of the content 210. At step 430, the event location 200 or the content itself 210 prompts the user to launch the application 120. This can occur through a verbal or visual reminder, which can be either an explicit request to launch the application 120, or more simply the display of an icon or logo. The application 120 is then launched to ensure that the application 120 will be active to detect the signal 220. In some embodiments, the application 120 may be always active and awaiting the signal 220. In these circumstances, there will be no need for the user to manually launch the application 120. In other circumstances, the user will launch the application at step 430.

At step 440, the content 210 or the event location 200 transmits the signal 220. In some embodiments, this occurs at the beginning of the event such as before the beginning of a feature movie presentation. The method splits at step 450 depending upon whether the application 120 was running on the device 100 and the signal 220 was detected by the application 120. If the signal 220 was detected, the application 120 at step 460 alters the device settings 130 of the device 100, causing the device 100 to enter "movie mode." The detection of the signal 220 will also cause the device 100 to synch to the movie content 210, such as by starting a timer within the device 100. This occurs at step 470. The timer then determines when the movie content 210 has reached the point at which the device 100 will provide access to the content 140 that was downloaded along with or as part of the application 120. At the appropriate time, the device will automatically awaken. For example, the signal at step 440 may be presented at the beginning of a feature movie, with the content 140 to be displayed during the movie credits more than an hour after the signal in step 440. The application will associate the signal 220 detected at step 450 with the appropriate movie 210 and content 140, and will therefore know that it should awaken after a given time interval. This occurs at step 480. Because the device may be in a pocket or on a lap when the device 100 awakens, the device 100 will also prompt the user when the content is about to be provided, such as by triggering vibration of the device 100.

With the user now looking at the device 100, the device will present the content 140 in sync with the event content 210 (e.g., the movie credits) at step 490. Once the content 140 has been presented and the movie content 210 is over (as determined by the timer triggered at step 470), the application 120 will once again alter the device settings 130 and take the device 100 out of movie mode. The process then ends.

The time counted by the timer before initiating the content in step 490 and altering the device settings 130 in step 500 will generally be stored in the application program 120. In one embodiment, different signals 220 can be associated within the application program 120 with different time values. The application program 120 looks up the appropriate time value based upon the signal 220 received. Alternatively, it would be possible to encode the delay time values within the signal 220 itself. In this way, the application program would simply identify the time values by decoding the signal, and then use these values to trigger the sharing of the content 140 and the alteration of the device settings 130.

Returning to FIG. 3, it is possible that the device 100 will not detect the signal in step 450. This could happen if the receiver 160 did not properly receive the signal 220, or if the user failed to launch the application 120 in step 430. In this case, the method 400 continues at step 510. If the application 120 had been launched and had not received the signal 220, then the application 120 and the device 100 will eventually go to sleep in step 510. In order to give users another chance to access the locked content 140, the event location 200 will again prompt users to launch the application 120 at step 520. This prompt 520 generally occurs at a different time than prompt 430, for instance at the end of main movie feature. A short time after this prompt, the event location 200 will issue another signal 220 at step 530. The device 100 uses this signal to start the synch timer in step 540. This step 540 is similar to step 470, except that the timers are being set at different time locations within the event content 210. In order to allow multiple entries into the stored content 140, the different signals at steps 440 and 530 must be differentiable by the device 100. Once the synch timer is started at 540 in response to the second synch signal, the method will proceed with steps 490 and 500. It is also possible to include additional synch signals during the time period when the device 100 should be displaying content 140 at step 490. These additional synch signals will allow users who did not comply with the earlier prompts to launch the application 120 in order to view the stored content 140 in progress.

Figure 4:
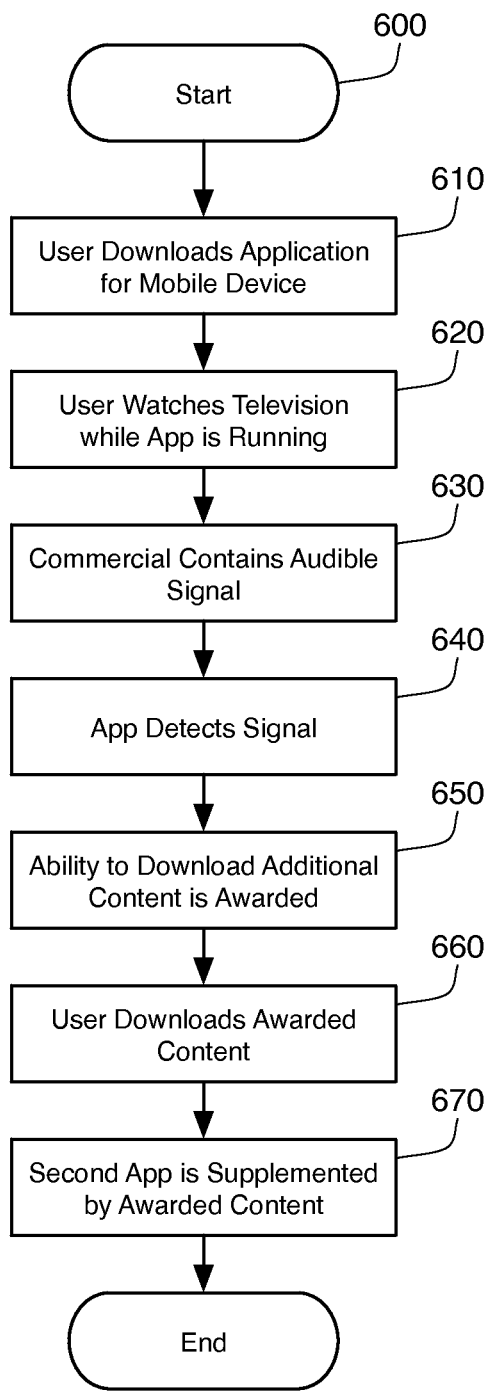
FIG. 4 is a flow chart showing a second method of using an embodiment of the present invention.

A second potential method 600 for using the disclosed embodiments of the present invention is shown in FIG. 4. In this method 600, the user starts the process by downloading the application 120 in step 610. As explained above, this app 120 may be operated on a variety of devices, including pocket PCs and tablet computers, such as the Apple iPad tablet device. In step 620, the user watches a television channel with their mobile device operating the app 120. The app 120 can be the primary application running on the mobile device, or may be running in the background. At step 630, a commercial appears on the television that contains the audible signal 220 in its soundtrack. The app running on the mobile device detects the signal 640, and in response awards to the user some desired content in step 650. In this embodiment, the desired content is made available by allowing the user to download the content over the Internet, which is accomplished by the user in step 660. In this case, the downloaded content is designed to supplement another application running on the mobile device. For example, the awarded content may be an additional character, monster, or level for a gaming application. The use of the content to supplement the game is shown in FIG. 4 as step 670, after which the method 600 ends.

Of course, the methods 400, 600 of FIGS. 3 and 4 are exemplary and are not the exclusive methods for using the disclosed embodiments. For instance, method 400 could be supplemented by unlocking additional content that could be used by the user after the device cancels the movie mode at step 500. In addition, method 600 could be used while observing video over the Internet as opposed to watching television, and the method could further be supplemented by presenting synchronized content along with the video. The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for triggering actions on a portable electronic device comprising:
   a) monitoring a microphone on the portable electronic device for an identifiable audio element found at a particular temporal location within a pre-recorded audio presentation;
   b) recognizing the identifiable audio element to identify the particular temporal location within the audio presentation;
   c) after recognizing the identifiable audio element, presenting visual information on a display of the portable electronic device in synchronization with the audio presentation, wherein the visual information comprises written text that is synchronized with the audio presentation.

2. The method of claim 1, wherein the text identifies audible words found within the audio presentation.

3. The method of claim 1, wherein the audio presentation is an audiovisual presentation that contains video.

4. The method of claim 3, wherein the audiovisual presentation is broadcast over a television signal.

5. The method of claim 4, wherein the identifiable audio element is recognized after when the audiovisual presentation is output over a television.

6. The method of claim 3, wherein the audiovisual presentation is transmitted over the Internet.

7. The method of claim 1, wherein the visual information is presented on the display after a predetermined amount of time has passed since the identifiable audio element is recognized.

8. The method of claim 7, wherein the predetermined amount of time is determined by a timer that is started when the identifiable audio element is recognized.

9. A method for triggering actions on a portable electronic device comprising:
   a) tracking user activity in a central database;
   b) providing an application program for download to a non-transitory memory on the portable electronic device, the application program containing programming to:
      i) await receipt of an identifiable audio element of a microphone on the portable electronic device, ii) upon receipt of the identifiable audio element, identifying a source for the identifiable audio element, and iii) awarding points in the central database to a user associated with the application program based upon the receipt of the identifiable audio element and the identified source; and c) presenting the identifiable audio element within a prerecorded audiovisual program.

10. The method of claim 9, wherein points are awarded based on the number, frequency, or variety of identified sources for a plurality of identifiable audio elements received by the application program.

11. A method for triggering actions on a portable computer electronic device comprising:

a) providing an application program for download to a non-transitory memory on the portable electronic device; and b) presenting a prerecorded audiovisual program, wherein the prerecorded audiovisual program contains a visual prompt to prompt a user to use the application program on the portable electronic device when viewing the audiovisual program, the audiovisual program further contains an identifiable audio element located temporally after the visual prompt in the audiovisual program;

c) wherein the application program contains programming that responds to the audiovisual program by:
    i) receiving the identifiable audio element over a microphone on the portable computer electronic device,
    ii) identifying the identifiable audio element, and
    iii) upon identifying the identifiable audio element, providing access through the portable electronic device to desired content.

12. The method of claim 11, wherein the desired content is located within the application program, such that the desired content is provided along with the application program for download together, wherein the desired content is not provided to users of the portable device until after the identifiable audio element is identified by the application program.

13. The method of claim 11, wherein the desired content is accessed over the Internet, such that access to the desired content over the Internet is not provided to users of the portable device until after the identifiable audio element is identified by the application program.

14. The method of claim 11, wherein the identifiable audio element is a sequence of successive tones.

15. A method for triggering actions on a portable electronic device comprising:

a) operating a gaming application on digital memory of the portable electronic device, the gaming application having hidden content that is not available for use upon a first operation of the gaming application;

b) monitoring a microphone on the portable electronic device for an identifiable audio element found within a pre-recorded audio presentation;

c) recognizing the identifiable audio element to identify the pre-recorded audio presentation;

d) after recognizing the identifiable audio element, unlocking the hidden content in the gaming application to make the hidden content available for use within the gaming application.

16. The method of claim 15, wherein the hidden content is a member of a set comprising an additional gaming character, an additional adversary, and an additional level.

* * * * *